United States Patent [19]
Pownall

[11] Patent Number: 5,882,580
[45] Date of Patent: Mar. 16, 1999

[54] DROSS PRESSES

[75] Inventor: Michael Pownall, Nottingham, United Kingdom

[73] Assignee: J. McIntyre (Machinery) Limited, Great Britain

[21] Appl. No.: 121,842

[22] Filed: Jul. 24, 1998

[30] Foreign Application Priority Data

Jul. 24, 1997 [GB] United Kingdom .................. 9715540

[51] Int. Cl.$^6$ .................................................. C22B 7/00
[52] U.S. Cl. ........................................... 266/205; 266/227
[58] Field of Search .................................. 266/227, 200, 266/201, 205, 207; 75/585, 672

[56] References Cited

U.S. PATENT DOCUMENTS

| | | | |
|---|---|---|---|
| 4,527,779 | 7/1985 | Roth et al. | 266/227 |
| 4,540,163 | 9/1985 | Van Linden et al. | 266/201 |
| 5,397,104 | 3/1995 | Roth | 266/227 |
| 5,599,379 | 2/1997 | Spoel et al. | 75/672 |
| 5,669,957 | 9/1997 | Roth | 75/672 |

*Primary Examiner*—Scott Kastler
*Attorney, Agent, or Firm*—Reese Taylor

[57] ABSTRACT

In a dross press the skim box containing the dross is vibrated to subject the dross to a vibrating motion thereby extracting additional aluminium from the dross.

8 Claims, 2 Drawing Sheets

DROSS PRESSES

The present invention relates to dross presses and more particularly to presses for extracting aluminium from hot aluminium dross removed from aluminium smelting furnaces.

In a known press as described in PCT Patent Application No. WO 96/32514 aluminium dross is pressed to remove molten aluminium and to cool the dross leaving a skull which in an ideal situation would have no aluminium left but would comprise only oxides and impurities.

However in a practical situation much of the aluminium remains either on the surface of the skull or within the skull.

The skull can be further processed after being broken into pieces and the remaining aluminium can then be recovered by further processing. However this is often not carried out by the furnace owner and therefore any aluminium remaining in the skull is lost to the furnace owner and only being recoverable by the further processor.

To attempt to remove additional aluminium from the dross, the head is cycled in a vertical motion to compress the dross but even with this cycling aluminium tends to be trapped in the skull or as it cools to adhere to the outside of the skull between the skull and the head or between the skull and the skim box.

It is an object of the present invention to increase the yield of aluminium from the dross in each filling of the skim box.

The present invention therefore provides a dross processing apparatus comprising skim box means for holding a quantity of hot aluminium dross and including means for vibrating the skim box means to assist in the removal of aluminium from the dross.

The term vibrating is intended to include continuous vibration or intermittent shocks at intervals.

The vibration is preferably performed by subjecting the skim box to a sharp vertical movement to assist in the downward movement of aluminium towards a drainage hole situated in the bottom of the skim box.

The vibration mechanism may be hydraulic or pneumatic; both reciprocating or electric eccentric counterweighted motor or rotary cam and follower or may be ultrasound.

The present invention also provides a dross processing apparatus comprising a cabinet, press head means situated within said cabinet for cooperation with a skim box which in operation is positioned below said press head means, said skim box having a drainage hole at a lowermost position and including a sow mould situated below said skim box to collect molten aluminium draining through said drainage hole, characterised in that vibration means for vibrating the skim box are attached to said cabinet and are operative to vibrate said skim box to extract additional aluminium from the dross.

Preferably the vibration means comprises at least one hydraulic ram having an actuating rod, the actuating rod being pivotally attached to one end of an elongate lever pivoted at a central position and in which the opposite end of the elongate lever being positioned to strike an underneath surface of the skim box on operation of the hydraulic ram.

The hydraulic ram preferably includes control valve means for supplying hydraulic pressure to said ram to operate the lever at defined time intervals.

Preferably two hydraulic rams are provided to lift both sides of the skim box.

The press also provides means for synchronising the vibration means with the main hydraulic ram controlling the press head.

BRIEF DESCRIPTION OF THE DRAWINGS

Embodiments of the present invention will now be described with reference to the accompanying drawings in which.

Figure 1:
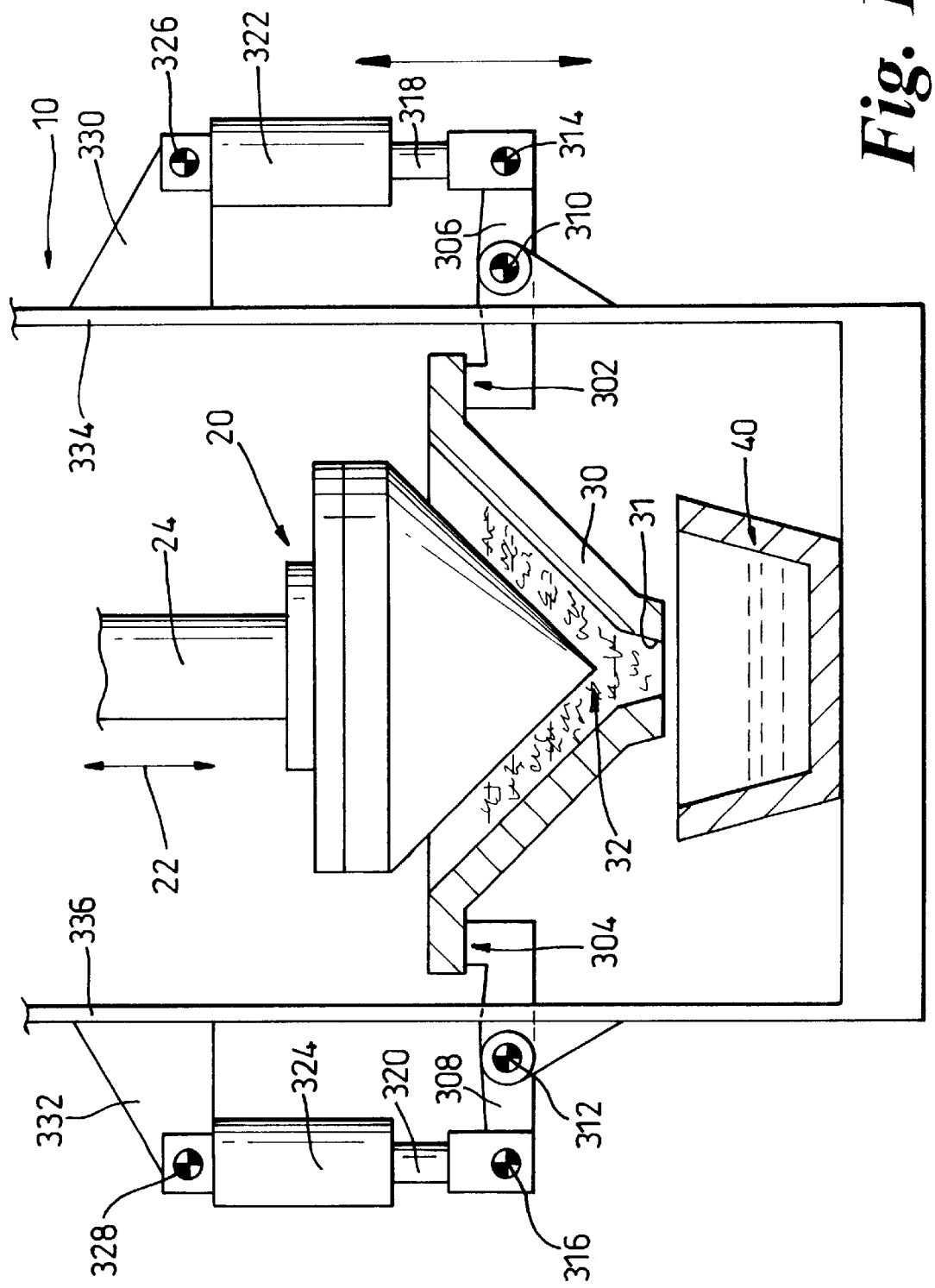
FIG. 1 shows schematically a first embodiment of a dross press according to the present invention incorporating vibration means for the skim box.

With reference now to FIG. 1, the press 10 comprises a press head 20, a skim box 30 and a sow mould 40. the press may be of the general design of presses as described in PCT Applications Nos WO96/32513, WO96/32514 and WO96/32515 to the same applicant, the descriptions of which are incorporated herein by reference.

The design of the head, skim box and sow mould are not generally the concern of the present invention but the skim box has to have means for enabling it to be vibrated.

Figure 2:
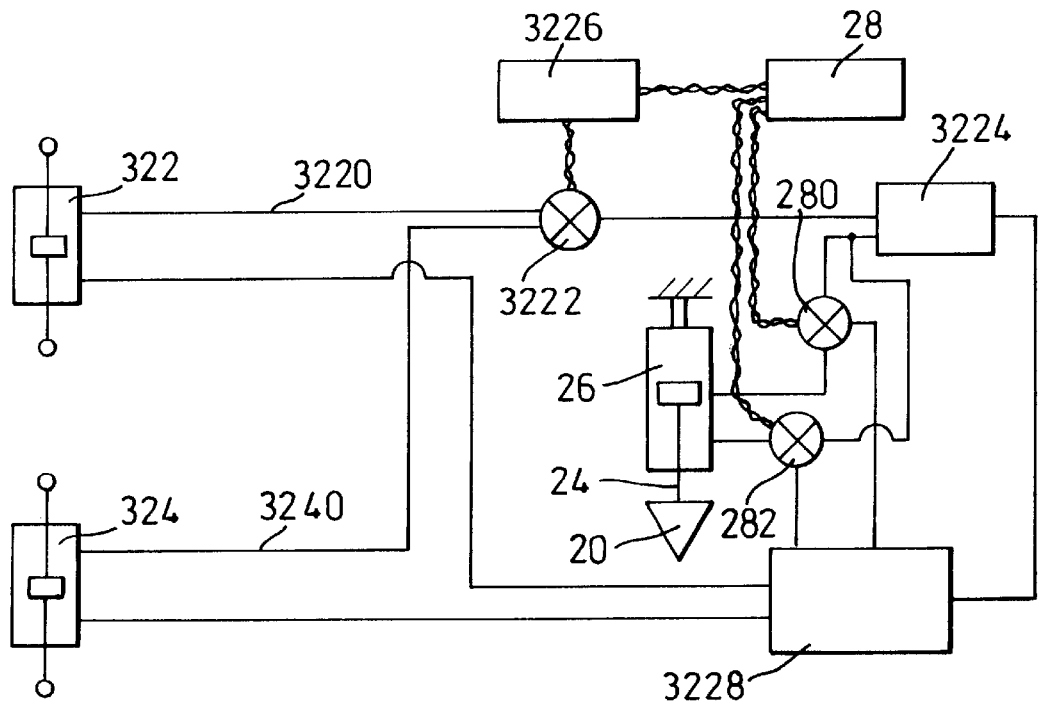
FIG. 2 shows diagrammatically a control system suitable for the embodiment of FIG. 1.
Figure 3:
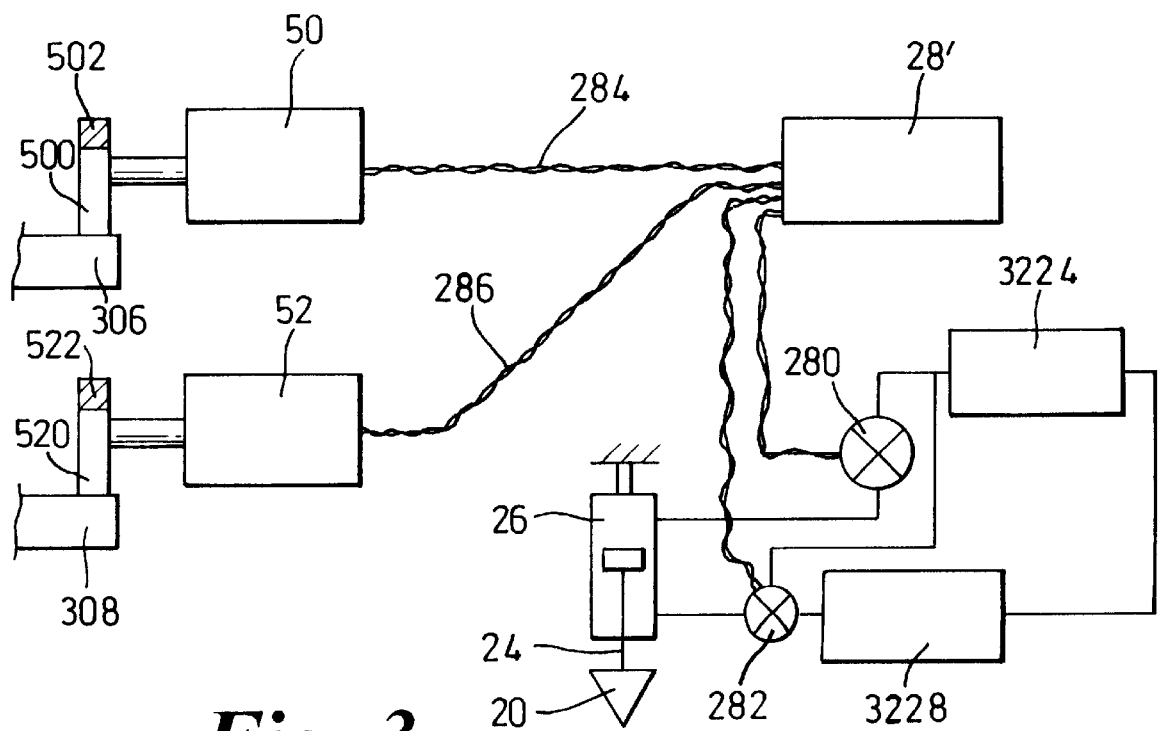
FIG. 3 shows diagrammatically an alternative control system for an alternative embodiment to the press of FIG. 1.

In the first embodiment, as shown in FIG. 1, the press head is vertically moveable in the direction shown by arrows 22 by a hydraulic ram operating rod 24 attached to a hydraulic ram 26 (see FIGS. 2 and 3).

Skim box 30 is supported on the ends 302,304 of two levers 306,308. The levers 306,308 are pivoted at points 310,312 and also at their other ends at 314,312 and also at their other ends at 314,316 where they are connected to the operating rods 318,320 of hydraulic cylinders 322,324. The cylinders are pivotally connected at 326,328 to brackets 333,332 which are affixed to the sides 334,336 of the cabinet.

By pulsing hydraulic pressure in each cylinder 322,324 the levers 306,308 cause the skim box 30 to be vibrated. This action shakes the aluminium dross 32 within the skim box 30 and produces a greater drainage of aluminium into the sow mould 40.

The vibration timing is preferably controlled in combination with the action of press head 20, as explained with reference to FIGS. 2 and 3.

In FIG. 1 the vibration is created by reciprocating hydraulic cylinders but these could be pneumatic. Also, the vibration could be created by other suitable means such as an electric eccentric counterweighted motor or rotary cam and follower. In the latter case, this could operate on the ends 314,316 of levers 306,308.

Also, it may be possible to use ultrasound to generate vibration within the mass of dross.

With reference now to FIG. 2, in a first embodiment the vibration system is as shown in FIG. 1 and comprises two hydraulic cylinders 322,324 which are supplied with high pressure hydraulic fluid via pipes 3220,3240 via valve 3222. High pressure is generated by pump 3224 and the valve 3222 is controlled by a timer 3226 which is operative to open valve 3222 at predetermined timed pulse intervals to allow vibration of the skim box only during these time intervals.

Timer 3226 may preferably be also connected to a microprocessor sequencer unit 28 which controls movement of the main hydraulic ram 26 by control of valves 280,282 to respectively lower and raise the ram. For example, the timer unit 3226 may be switched off once the sequencer 28 has commenced lowering the main ram 26 and commenced again once the main ram 26 has lifted the head pressure from the dross 32.

In the drawing straight lines indicate hydraulic connections and twisted lines indicate electrical/electronic control connections.

The hydraulic fluid is returned in known manner to a main reservoir 3228 from which it is supplied to the hydraulic motor 3224.

An alternative embodiment is shown in FIG. 3 in which like reference numerals identify similar components to those in FIG. 2. Thus in FIG. 3 the main ram 26 is controlled as previously by a microprocessor 28' which is similar to that of FIG. 3 but includes two further electrical outputs 284,286 which are respectively connected to energise two electric eccentric counterweighted motors 50,52. These motors may have eccentric cams 500,520 with cam surfaces 502,522 which operate on the ends 314,316 of levers 306,308 to provide the necessary vibrating action.

Sequence processor 28' may therefore, as with processor 28 in FIG. 2, inhibit the vibrating action at predetermined time intervals, for example, once head 20 is descending to press the dross 32.

Often with dross the aluminium is squeezed out of the mass of the dross to remain on the surfaces of the skull formed by the press head 20. The vibrating action causes the semi molten aluminium to be shaken down towards the drainage hole 31 of the skim box 30 to either automatically drain into sow mould 40 or to be squeezed out at the next press action. Additionally, prior to any pressing action by press head 20 the molten aluminium is vibrated downwardly towards drainage hole 31 and also individual globules of aluminium are vibrated to join neighbouring globules thereby forming larger globules which are more readily pressed out of the skull once a pressing operation commences.

I claim:

1. A dross processing apparatus comprising skim box means for holding a quantity of hot aluminium dross and including means for vibrating the skim box means to assist in the removal of aluminium from the dross.

2. A dross processing apparatus as claimed in claim 1 in which the vibration is performed by subjecting the skim box to a sharp vertical movement to assist in the downward movement of aluminium towards a drainage hole situated in the bottom of the skim box.

3. A dross processing system as claimed in claim 1 in which the vibration mechanism is hydraulic or pneumatic; both reciprocating or electric eccentric counterweighted motor or rotary cam and follower or ultrasound.

4. A dross processing apparatus comprising a cabinet, press head means situated within said cabinet for cooperation with a skim box which in operation is positioned below said press head means, said skim box having a drainage hole at a lowermost position and including a sow mould situated below said skim box to collect molten aluminium draining through said drainage hole, characterised in that vibration means for vibrating the skim box are attached to said cabinet and are operative to vibrate said skim box to extract additional aluminium from the dross.

5. A dross processing system as claimed in claim 4 in which the vibration means comprises at least one hydraulic ram having an actuating rod, the actuating rod being pivotally attached to one end of an elongate lever pivoted at a central position and in which the opposite end of the elongate lever being positioned to strike an underneath surface of the skim box on operation of the hydraulic ram.

6. A dross processing system as claimed in claim 5 in which the hydraulic ram includes control valve means for supplying hydraulic pressure to said ram to operate the lever at defined time intervals.

7. A dross processing system as claimed in claim 5 in which two hydraulic rams are provided to lift both sides of the skim box.

8. A dross processing system as claimed in claim 5 in which the press also provides means for synchronising the vibration means with the main hydraulic ram controlling the press head.

* * * * *